US012333639B2

(12) United States Patent
Tumanov et al.

(10) Patent No.: US 12,333,639 B2
(45) Date of Patent: Jun. 17, 2025

(54) SYNTHETIC AUDIO-DRIVEN BODY ANIMATION USING VOICE TEMPO

(71) Applicant: NVIDIA Corporation, Santa Clara, CA (US)

(72) Inventors: Evgeny Aleksandrovich Tumanov, Moscow (RU); Dmitry Aleksandrovich Korobchenko, Moscow (RU); Simon Yuen, Playa Vista, CA (US); Kevin Margo, Los Gatos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/007,867

(22) PCT Filed: Nov. 8, 2021

(86) PCT No.: PCT/RU2021/000485
§ 371 (c)(1),
(2) Date: Dec. 2, 2022

(87) PCT Pub. No.: WO2023/080806
PCT Pub. Date: May 11, 2023

(65) Prior Publication Data
US 2024/0233229 A1    Jul. 11, 2024

(51) Int. Cl.
*G06T 13/00*    (2011.01)
*G06T 13/20*    (2011.01)
*G06T 13/40*    (2011.01)

(52) U.S. Cl.
CPC ............ *G06T 13/205* (2013.01); *G06T 13/40* (2013.01)

(58) Field of Classification Search
CPC ......... G06T 13/40; G06T 13/00; G06T 13/80; G06T 13/20; G06T 17/00; G06T 19/003;
(Continued)

(56) References Cited

U.S. PATENT DOCUMENTS

| | | | |
|---|---|---|---|
| 2003/0076757 A1* | 4/2003 | Kanou | G10H 1/40 369/47.16 |
| 2005/0273331 A1* | 12/2005 | Lu | G06V 40/171 704/E21.02 |

(Continued)

*Primary Examiner* — Gordon G Liu
(74) *Attorney, Agent, or Firm* — Taylor English Duma L.L.P.

(57) ABSTRACT

In various examples, animations may be generated using audio-driven body animation synthesized with voice tempo. For example, full body animation may be driven from an audio input representative of recorded speech, where voice tempo (e.g., a number of phonemes per unit time) may be used to generate a 1D audio signal for comparing to datasets including data samples that each include an animation and a corresponding 1D audio signal. One or more loss functions may be used to compare the 1D audio signal from the input audio to the audio signals of the datasets, as well as to compare joint information of joints of an actor between animations of two or more data samples, in order to identify optimal transition points between the animations. The animations may then be stitched together—e.g., using interpolation and/or a neural network trained to seamlessly stitch sequences together—using the transition points.

22 Claims, 8 Drawing Sheets

(58) Field of Classification Search
CPC ....... G06T 19/20; G06T 13/205; A63F 13/10; H04L 51/04
USPC ........................................................ 345/473
See application file for complete search history.

(56) References Cited

U.S. PATENT DOCUMENTS

| | | | |
|---|---|---|---|
| 2010/0238182 A1* | 9/2010 | Geisner .................. | G06T 13/00 345/474 |
| 2021/0248801 A1* | 8/2021 | Li ......................... | G06T 13/205 |
| 2022/0270337 A1* | 8/2022 | Fu ........................... | G06T 7/70 |
| 2023/0005201 A1* | 1/2023 | Wu ....................... | G06T 13/205 |
| 2024/0177386 A1* | 5/2024 | Obukhov ................ | G10L 13/10 |

* cited by examiner

SYNTHETIC AUDIO-DRIVEN BODY ANIMATION USING VOICE TEMPO

BACKGROUND OF THE INVENTION

Animating actors in such a way that the actors appear and move naturally is a challenging task, and one that takes time and effort. There are many use cases—gaming, virtual assistants, animation, etc.—where an actor performing plausible human gestures is desired (e.g., to avoid distracting gestures or movements), while also allowing for artistic control over the style of the animation. Traditionally, generating such an animation required frame by frame generation of both the facial features as well as the body of an actor. However, recent approaches have attempted to generate human gestures from audio of recorded speech.

For example, some approaches use end-to-end neural networks to synthesize animation using recorded audio as input. In such examples, the neural network may compute an output indicative of the animation, and the actor may be animated according to the computed output. Relying on a neural network in an end-to-end fashion requires a large amount of training and ground truth data, and results in a neural network that is not robust to input voices that the neural network is not trained on. For example, to increase accuracy, the neural network needs to be trained on training data for each person who provides the recorded voice for the audio data, which is both time consuming, compute intensive, and not easily scalable. In addition, because the neural network may operate as an end-to-end solution, the ability for artistic control may be lost, and the output of the neural network alone is relied upon.

As a further example, some approaches use a pre-computed graph to search for motion sequences that match input audio clips. The graph may be used to search for motion sequences that respect three forms of audio-motion coordination: coordination to phoneme clause (e.g., a group of words that have one strongly stressed word): listener response: and a conversation partner's hesitation pause. However, these audio-motion coordination forms are focused on conversations between two or more actors engaged in conversation, and thus are ineffective for non-conversational dialogue animations.

SUMMARY OF THE INVENTION

Embodiments of the present disclosure relate to audio-driven body animation synthesized with voice tempo. Systems and methods are disclosed that use a one-dimensional (1D) audio signal representative of a voice tempo—which may be generated using a neural network, in embodiments—to animate bodies of actors. For example, full body animation may be driven from an audio input representative of recorded speech, where voice tempo (e.g., a number of phonemes per unit time) is used to generate the 1D audio signal for comparing to datasets including data samples that each include an animation and a corresponding 1D audio signal. One or more loss functions may be used to compare the 1D audio signal from the input audio to the audio signals of the datasets, as well as to compare joint information of joints of an actor between animations of two or more data samples in order to identify optimal transition points between the animations. The animations may be stitched together using any of a number of different techniques—e.g., interpolation, using deep learning, etc.—such that as an animation clip transitions to another animation clip, the gestures appear seamless, natural, and believable. By performing audio-driven body animation in this way, more artistic control may be realized as any number of potential animation sequences may be determined (and ranked, based on cumulative loss function scores, in embodiments). As such, multiple options for the animations may be presented for selection by an artist. In addition, because the selection of animations from the datasets does not require conversational calculations (e.g., listener's response, partner's hesitation pause, etc.), the input audio may be used to generate an animation for a single actor—e.g., a virtual avatar in a gaming application, an in-vehicle application, a smart home application, a video conferencing application, a mobile application, and/or the like.

BRIEF DESCRIPTION OF THE DRAWING

The present systems and methods for audio-driven body animation synthesized with voice tempo are described in detail below with reference to the attached drawing figures, wherein.

DETAILED DESCRIPTION OF THE INVENTION

Figure 1A:
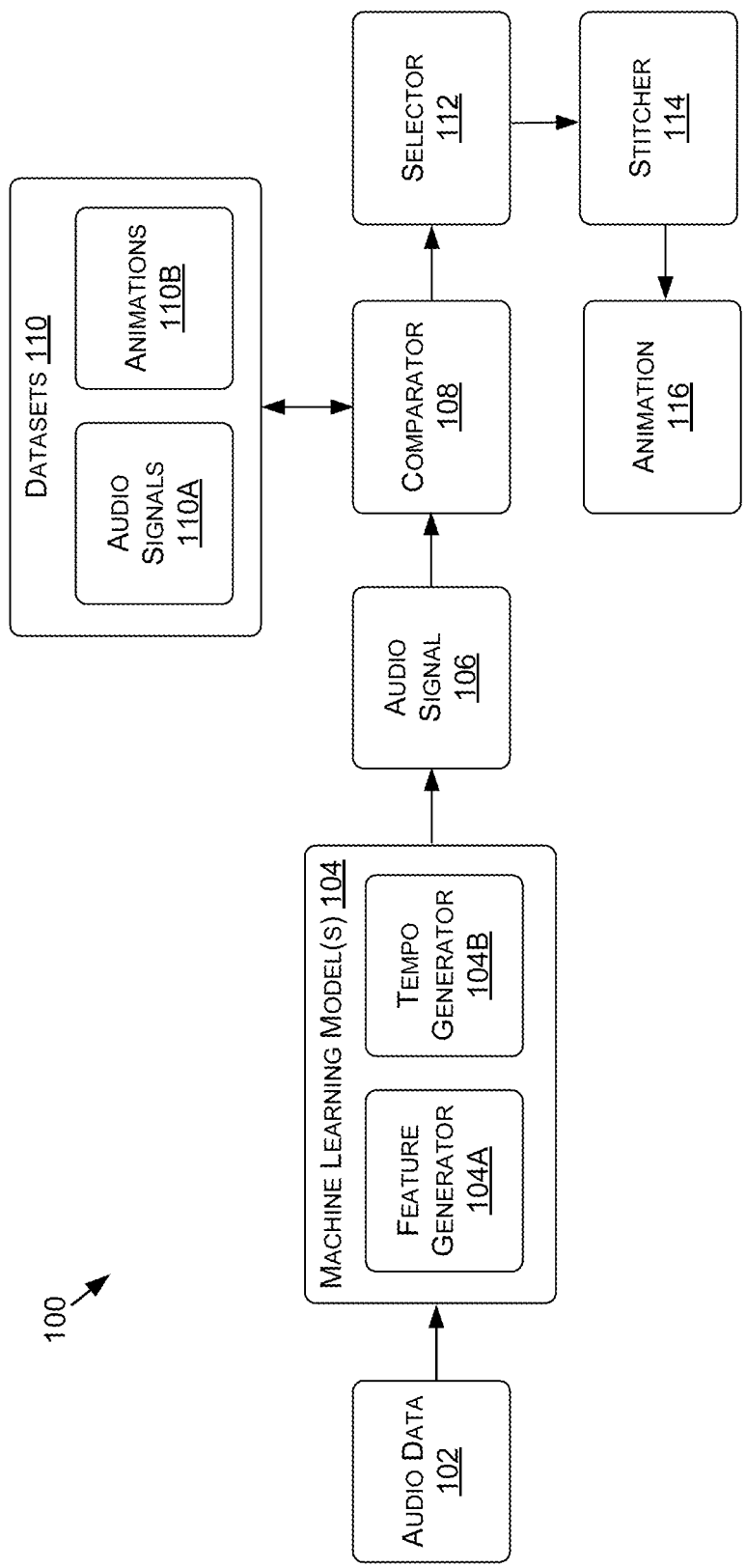
FIG. 1A is an example data flow diagram illustrating a process for audio-driven body animation synthesized with voice tempo, in accordance with some embodiments of the present disclosure.

Systems and methods are disclosed related to audio-driven body animation synthesized with voice tempo. The animated actors described herein may be implemented in any number of technology spaces and within any number of applications including but not limited to those described herein. For example, the animated actors described herein may be implemented for video conferencing applications (e.g., to participate in conversation for answering questions, displaying information, etc.), smart speaker and/or smart display applications (e.g., for playing music, videos, controlling coupled devices, placing order, providing information, etc.), vehicle (e.g., autonomous, semi-autonomous, non-autonomous, etc.) applications (e.g., for in-vehicle controls, interactions, information, etc.), restaurant applications (e.g., for ordering, interacting with a menu, etc.), retail applications (e.g., for store information, item information, etc.), web applications (e.g., for assisting in navigating a web page), computer aided design or architectural applications (e.g., for manipulating, interacting with, and/or displaying designs, models, etc.), customer service applications (e.g., use video calls to speak to a rendered AI customer service agent), gaming application (e.g., as bots or avatars in a game, such as an avatar of a user that mimics the speech and/or body language of the real-world user in a virtual environment), and/or in other technology spaces or applications.

In some embodiments, a neural network (such as an autoencoder neural network) may be trained on a data corpus to extract latent representations of input audio. An additional neural network may be built on top of the autoencoder neural network that may be trained to predict a number of phonemes observed during each time unit of the input audio using the latent representations of the input audio. In some embodiments, the additional neural network may be trained using a dataset of voice data, and the voice data may be augmented to accelerate or slow down the audio in order to train the network on a variety of different input audio types (e.g., different/diverse voices of varying/diverse tempo). This neural network stack (which may be implemented in embodiments as a single combined neural network, or two separate stacked networks) may be used to compute an audio signal (e.g., a one-dimensional (1D) signal, indicative of tempo).

The dataset may include animation sequences $m_s = (p_0^s, \ldots, p_{T_s}^s)$ and corresponding audio signal sequences (e.g., represented using a 1D signal, indicative of tempo) $a_s = (f_0^s, \ldots, f_{T_s}^s)$. In deployment, in order to generate a final animation for an input audio signal $a^* = (f_0^*, \ldots, f_n^*)$, an optimal sequence of poses observed in the dataset (where poses may be from different scenes or clips) $(p_{t_0}^{s_0}, \ldots, p_{t_n}^{s_n})$ may be selected using the following loss function:

$$\sum_{k=0} L_m(p_{t_k}^{s_k}, p_{t_k-1}^{s_{k+1}}) + \sum_{k=0} L_a(f_{t_k}^{s_k}, f_k^*) \to \min$$

$L_a$ may penalize the difference between the 1D signal of the input audio and the 1D signal from data samples in the dataset. In embodiments, the difference may be computed using a squared difference of the arguments. $L_m$ may penalize consequent poses which were not observed in the dataset as consequent (where the poses are consequent in the dataset, $L_m$ may be 0). Thus, if $s_{k+1} = s_k$ and $t_{k+1} - t_k = 1$, then $L_m = 0$. Otherwise, the loss function, $L_m$, may be an L2 metric that penalizes large differences between joints (e.g., hands, elbows, shoulders, etc.) or joint information of the actor that is the subject of the animation. For example, the differences between the joints may be computed using world-space positions of the joints and velocities of the joints. To solve this optimization problem, an initial set of candidates, $\{c_i\}$, that are entirely observed in the dataset (e.g., the training data, or pre-generated data) may be selected. Thus, the first term of the loss is equal to zero for all $\{c_i\}$. $\{c_i\}$ are the best animation sequences if only the second sum in the loss (e.g., the sum corresponding to $L_a$, after comparing the 1D audio signal of the input audio to the 1D audio signal of the dataset(s)). Once $\{c_i\}$ are determined, a probabilistic optimization may be executed for some number of epochs. At each epoch, two candidates from $\{c_i\}$ may be sampled, and a "crossover" operation may be performed. The crossover operation may find optimal transition points or jumps (e.g., based on outputs of one or more loss functions) from frames observed in $c_i$ to frames from $c_j$ (e.g., a next potential candidate in the sequence). After many pairs of transition points are sampled, the top results may be filtered to generate the best N results. This process may be repeated at each epoch.

In some embodiments, optimization—implemented, for example and without limitation, as an application of a greedy algorithm—may be implemented using a graph structure. For example, using the datasets, a graph may be precomputed using the two loss terms to generate nodes (corresponding to frames from the data samples) and edges between the nodes. The edges may be generated by looking at the nearest neighbor frames that are optimal or above a threshold with respect to the first loss term and/or the second loss term. As such, for $L_m$, the nodes where transitions from the current frame node to the next frame node has a position cost that is less than a threshold may be considered for an edge link. In such cases, adjacent frames (e.g., frame 1 and frame 2 from same clip) may always have an associated edge generated between their respective nodes. With respect to $L_a$, the 1D audio signal between the nodes may be compared, and links or edges may be generated based on the similarity between the 1D audio signals (or tempos). In such examples, because the tempo generally does not change much across adjacent frames, adjacent frames may usually have an associated edge generated between them. Other non-adjacent frames may only have edges between their respective nodes when the loss is below a threshold, indicating less of a discrepancy in the 1D audio signals of the frames. The nodes and edges may be generated between sequential clips and/or between different clips, in embodiments.

Once the graph is precomputed, and during runtime, the 1D audio signal from the input audio may be compared using $L_a$ to determine a starting node in the graph (e.g., a starting node with the lowest $L_a$). Once the starting node is determined, the nearest N nodes of the starting node may be analyzed in view of one or more of the loss terms, and the nodes with the lowest or best losses may be selected as the next node, and so on. To avoid constant jumps between non-consequent frames from the dataset, a limit may be put on the number of jumps to non-consequent frames (e.g., no more than one jump per 10 frames). In some embodiments, a new starting node may be selected periodically.

In some embodiments, the selection of animation sequences from datasets may be implemented using a machine learning model(s)—e.g., a neural network(s)—that generates latent space representations of data samples and given test input audio generates latent vectors in the same space. Then, using a similarity measure (e.g., a Euclidean distance), generated latent vectors are compared to the vectors observed within training data, and the best matching vectors are found and stacked to form an output animation sequence. The neural network may be trained to output animations from the data samples of minimal loss value—e.g., using the loss functions described herein.

The result of the optimization operation(s) may be an animation that includes stitched together clips (each including a corresponding animation from a data sample of the dataset(s)) from the dataset that are determined to correspond most closely to the 1D signal from the input audio. The clips may be stitched together from a transition point of a clip through at least a portion of the frames of the next clip. To stitch together the transition portion between the two clips, interpolation may be used based on the joint angles to transition from the joint locations in the first clip to the joint locations in the second clip gradually. In some embodiments, the stitching may be executed using a neural network (e.g., a recurrent neural network, generative adversarial network (GAN), and/or another network type) that is trained to generate transitions between two animation sequences (e.g., between an animation of a first clip and an animation of a second, subsequent clip).

Due to the global optimization of the systems and methods described herein, any number of plausible animations may be presented for selection. Users may control which scenes are considered for optimization of the loss, and may also modify the loss by assigning different weights for the loss terms and/or by tweaking the parameters of $L_m$. As a result, some artistic control is still allowed, while also resulting in smooth, natural gestures in the resulting animations.

With reference to FIG. 1A, FIG. 1A is an example data flow diagram illustrating a process 100 for audio-driven body animation synthesized with voice tempo, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the process 100 may include similar components, features, and/or functionality as example content streaming system 400 of FIG. 4, example computing device 500 of FIG. 5, and/or example data center 600 of FIG. 6.

The process 100 may include generating and/or receiving audio data 102. The audio data 102 may be representative of voice data from recorded speech and/or from computer generated speech. For example, the audio data 102 may be generated using one or more microphones, and/or may be generated by simulation voice using a computer application. The audio data 102 may correspond to live speech, pre-recorded speech, real-time simulated speech, pre-generated simulated speech, and/or another speech input type, depending on the embodiment.

The audio data 102 may be processed using one or more machine learning models 104—such as one or more deep neural networks—to generate an audio signal 106 (e.g., a 1D output signal representative of voice tempo, as measured using a number of phonemes per time unit, in embodiments). The machine learning model(s) 104 may include any type of machine learning models, depending on the embodiments. For example, and without limitation, the machine learning model(s) 104 may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), and/or other types of machine learning models.

In some embodiments, the machine learning model(s) 104 may include a convolutional neural network(s). For example, the machine learning model(s) 104 may include a feature generator network 104A and a tempo generator network 104B. In some embodiments, the feature generator network 104A and the tempo generator network 104B may include a single network, while in other embodiments the feature generator network 104A and the tempo generator network 104B may include two separate networks stacked in sequence. In either embodiment, the feature generator network 104A may include one or more layers to process the audio data 102 to compute a latent space feature representation of the audio (e.g., audio to feature representation), and the tempo generator network 104B may include one or more layers to process the latent space feature representation to compute the audio signal 106.

The audio signal 106 may include, in non-limiting embodiments, a 1D signal representative of a voice tempo—e.g., as measured using a number of phonemes per time unit. However, this is not intended to be limiting, and the audio signal 106 may additionally or alternatively represent the voice tempo using another measurement, such as phoneme clauses per time unit (e.g., seconds, minutes, etc.), words per time unit (e.g., seconds, minutes, etc.), syllables per time unit (e.g., seconds, minutes, etc.), number of physically observable phonetic units (or phones) per time unit (e.g., seconds, minutes, etc.), and/or another measure of tempo. In other embodiments, the voice tempo may be estimated as a number of phonemes per time unit normalized by the average length of the detected phonemes. As an example, assuming that in the datasets 110 at some time unit of size L with phonemes X, Y, and Z, having corresponding lengths x, y, and z. In such an example, the average lengths of the respective phonemes within the dataset(s) 110 are mx, my, and mz. As non-limiting examples, using this information, the tempo may be assigned as 3/L, or may be assigned as (x/mx+y/my+z/mz)/L.

The audio signal 106 may be compared to the datasets 110 using comparator 108 to determine frames (or clips of frames) from the datasets 110 that are similar to the audio signal 106 in order to select (using selector 112) frames (or clips) to stitch (using stitcher 114) together to generate an animation 116. The datasets 110 may include audio signals 110A and/or animations 110B. For example, each data sample of the datasets 110 may include an audio signal 110A and a corresponding animation 110B. The audio signals 110A may be similar to those of the audio signal 106, but may be pre-generated in combination with the animations 110B for including in the datasets 110. In some embodiments, the datasets 110 may be referred to as training datasets 110, pre-generated datasets 110, or reference datasets 110. As such, the animations 110B from the datasets 110 may be selected as the animations to use in generating the animation 116 from the input audio data 102. In this way, the audio signal 106 may be used to compare to the audio signals 110A in order to find animations 110B that most closely (or closely, while allowing artistic control) correspond to the input audio data 102.

Figure 2A:
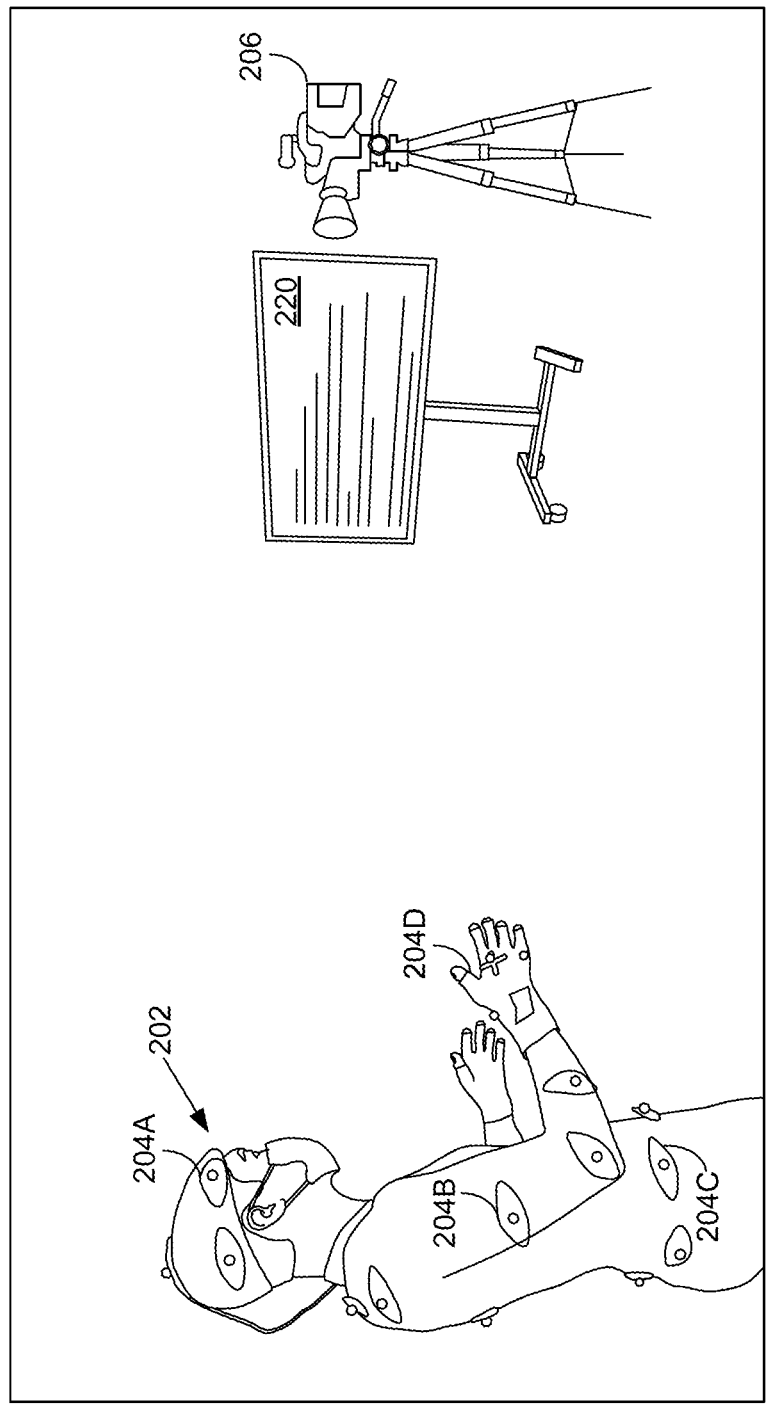
FIG. 2A is an illustration of an example data collection environment for generating datasets, in accordance with some embodiments of the present disclosure.

In some embodiments, to generate the datasets 110, motion capture may be used. For example, and with reference to FIG. 2A, a user 202 may have multiple sensors 204 (e.g., 204A, 204B, 204C, 204D, etc.) disposed thereon, and a camera 206 may be used to track the movement of the user 202 as the user speaks. For example, the user may read text (e.g., from a screen 220) and/or may speak freely or from memorization and move their body, joints, hands, etc. while doing so. In some embodiments, the user 202 may move their body naturally, or may perform more dramatic, more subtle, and/or other gesture types in order to increase the size and diversity of the datasets 110. In some embodiments, gestures of a specific semantic sense may be performed and included a dataset 110. For example, these gestures may include a gesture for "No" (e.g., thumbs down), "Yes" (e.g., thumbs up), "Stop" (e.g., palm of hand facing outward, arm extended), or an indicia of size (e.g., separating hands some distance to indicate size), etc. In such examples, this semantic sense of a given speech or input audio 106 may be detected (or the system may be directly informed to generate gestures for these specific cases), and the system may be triggered to use this additional information when solving the optimization problem of $L_a+L_m \rightarrow \min$.

In addition, the user 202 may speak naturally, quickly, loudly, softly, slowly, and/or in another manner to further increase the size and diversity of the datasets 110. In some embodiments, measurements may be taken of an entire body of the user 202, while in other embodiments, only certain parts of the body may be measured—such as the joints. The sensors 204 may be used, in embodiments, to measure data about the joints (e.g., elbows, shoulders, hands, fingers, etc.)—such as position (or location), velocity, acceleration, etc. For example, the velocity and world-space location of the joints may be measured, and this information may be used when determining transitions between frames or clips of frames of the animations 110B during stitching. This process may be repeated for any number of users to generate data samples in the datasets 110 that correspond to any number of different movement and/or speech styles or tempos.

In some embodiments, in addition to or alternatively from motion capture, the datasets 110 may be generated using pre-recorded video (e.g., from content streaming applications or services) or speeches, conversations, and/or the like. For example, the video may be analyzed (e.g., using computer vision) to determine the movement of the speaker(s) for generating the animations 110B, and the text or audio may be analyzed to generate the audio signals 110A. Although motion capture and video analysis are described herein, this is not intended to be limiting, and the animations 110B and corresponding audio signals 110A may be generated using any suitable technique without departing from the scope of the present disclosure.

Figure 2B:
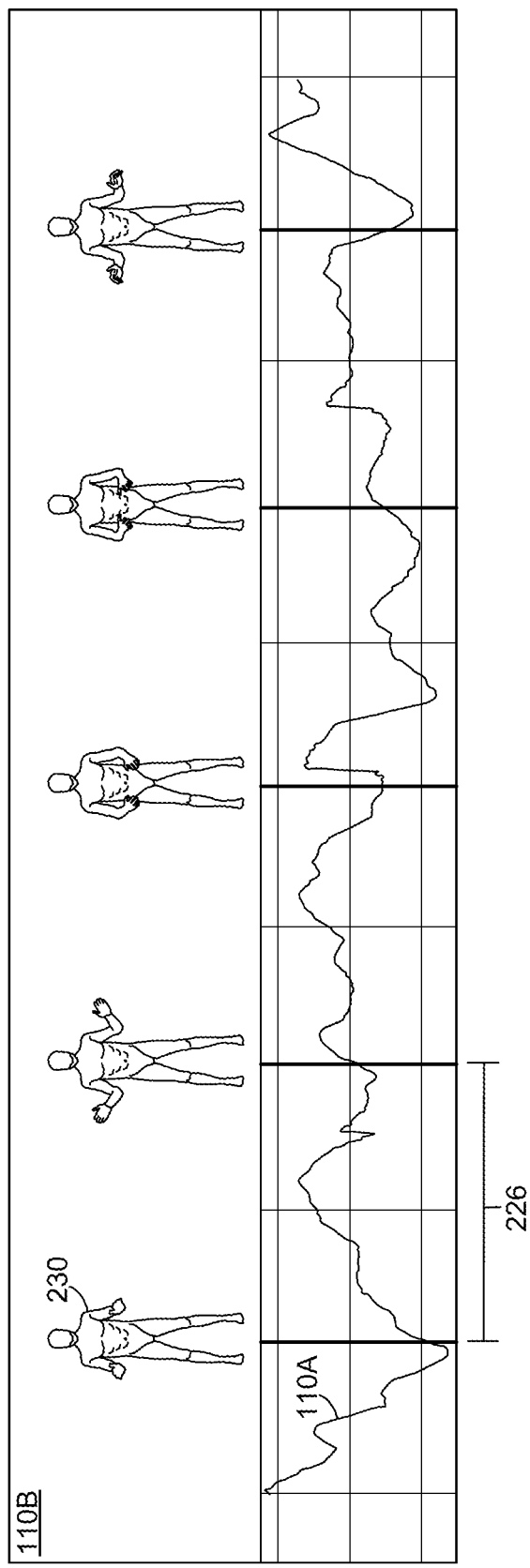
FIG. 2B is an illustration of a sequence of data samples from a dataset including animations and corresponding audio signals, in accordance with some embodiments of the present disclosure.

With reference to FIG. 2B, FIG. 2B illustrates a single portion of sequence of animations 110B and corresponding audio signals 110A from the datasets 110. For example, the illustration of FIG. 2B may correspond to several consecutive clips 226 (e.g., each clip including some number of frames, such as 30, 60, 96, etc.) of animation 110B along with the associated audio signals 110A. Each illustrated actor in FIG. 2B may correspond to a gesture of an animated actor 230 at the end or beginning of a clip 226 (e.g., at a transition point between two clips). The datasets 110 may thus include any number of sequential animations 110B and associated audio signals 110A.

To determine the associated animation(s) 110B for a current audio signal 106, one or more loss functions may be implemented by the comparator 108. For example, the comparator 108 may use a loss function to compare the audio signal 106 to the audio signals 110A, and/or to compare animations 110B associated with the audio signals 110A to other animations 110B associated with other audio signals 110A in order to find transitions points (e.g., optimal frames between consecutive clips to transition from one gesture to another gesture) for stitching together two or more clips of animations 110B. As such, the datasets 110 may include animation sequences 110B, $m_s=(p_0^s, \ldots, p_{T_s}^s)$ and corresponding audio signal sequences 110A (e.g., represented using a 1D signal, indicative of tempo), $a_s=(f_0^s, \ldots, f_{T_s}^s)$. In deployment, in order to generate a final animation for an input audio signal 106, $a^*=(f_0^*, \ldots, f_n^*)$, an optimal or desired sequence of poses observed in the datasets 110 (where poses may be from different scenes or clips), $(p_{t_0}^{s_0}, \ldots, p_{t_n}^{s_n})$, may be selected using the following loss function (as described herein):

$$\sum_{k=0} L_m(p_{t_k}^{s_k}, p_{t_{k-1}}^{s_{k+1}}) + \sum_{k=0} L_a(f_{t_k}^{s_k}, f_k^*) \rightarrow \min$$

$L_a$ may penalize the difference between the 1D signal of the input audio signal 106 and the 1D signal from the audio signals 110A of the datasets 110. In embodiments, the difference may be computed using a squared difference of the arguments. $L_m$ may penalize consequent poses between animations 110B which were not observed in the datasets 110 as consequent (where the poses are consequent in the dataset, $L_m$ may be 0). Thus, if $s_{k+1}=s_k$ and $t_{k+1}-t_k=1$, then $L_m=0$. Otherwise, the loss function, $L_m$, may be, as a non-limiting embodiment, an L2 metric that penalizes large differences between joints (e.g., hands, elbows, shoulders, etc.) or joint information of the actor that is the subject of the animations 110B. For example, the differences between the joints may be computed using world-space positions of the joints and velocities of the joints, in embodiments, and/or may include other joint information (e.g., acceleration, position, etc.).

Optimization may be performed, in some embodiments, by applying non-greedy global optima optimization. For example, an initial set of candidates, $\{c_i\}$, that are entirely observed in the dataset (e.g., the training data, or pre-generated data), entirely span the input, and/or serve the bottom M values for the second loss term, $L_a$, may be selected. Thus, the first term of the loss is equal to zero for all $\{c_i\}$. $\{c_i\}$ are the best animation sequences if only the second sum in the loss (e.g., the sum corresponding to $L_a$, after comparing the 1D audio signal 106 of the input audio data 102 to the 1D audio signal 110A of the dataset(s) 110). Once $\{c_i\}$ are determined, a probabilistic optimization may be executed for some number, N, of epochs. At each epoch, pairs of candidates from $\{c_i\}$ may be sampled, and a crossover operation may be performed. The crossover operation may find optimal transition points or jumps from frames observed in $\{c_i\}$ to frames from $\{c_j\}$ (e.g., a next potential candidate in the sequence). For example, the crossover operation may take two sequences of frames in the animations 110B and produce one or more optimal or best sequences, where the first X frames in the sequence are selected from the first animation sequence 110B in the datasets 110 and the T-X frames are selected from the second animation sequence 110B. As such, for an animation sequence corresponding to the audio signal 106 to be generated, pairs of sequences from the animations 110B may be sampled using one or more of the loss terms, $L_a$ and/or $L_m$, and a transition point between the pairs of sequences may be determined to result in a smooth (or smoothest, or best) transition point between the two animation sequences 110B. After many pairs are sampled, the top results may be filtered to generate the best N results. This process may be repeated at each epoch.

In some embodiments, optimization may be performed by applying a greedy algorithm using a graph structure. For example, using the datasets, a graph may be precomputed using one or more of the loss terms, $L_a$ and/or $L_m$, to generate nodes (corresponding to frames from the data samples) and edges between the nodes. The edges may be generated by looking at the nearest neighbor frames that are optimal or above a threshold with respect to the first loss term and/or the second loss term. As such, for $L_m$, the nodes where transitions from the current frame node to the next frame node has a position cost (e.g., using velocities and/or locations of joints of an actors across frames as computed using $L_m$) that is less than a threshold may be considered for an edge link. In such cases, adjacent frames (e.g., frame 1 and frame 2 from same clip) may always have an associated edge generated between their respective nodes. With respect to $L_a$, the 1D audio signal 110A between the nodes may be compared, and links or edges may be generated based on the similarity between the 1D audio signals (or tempos) 110A. In such examples, because the tempo generally does not change much across adjacent frames, adjacent frames may usually have an associated edge generated between them. Other non-adjacent frames may only have edges between their respective nodes when the loss is below a threshold, indicating less of a discrepancy in the 1D audio signals of the frames. As such, in embodiments, for each node (corresponding to a frame from the animations 110B), a nearest Q frames may be considered using the first loss function, $L_m$, and may be merged with P frames considering the second loss function, $L_a$. The nodes and edges may be generated between sequential clips and/or between different clips, in embodiments.

Once the graph is precomputed, and during runtime, the 1D audio signal 106 from the input audio data 102 may be compared using $L_a$ to determine a starting node in the graph (e.g., a starting node with the lowest $L_a$). Once the starting node is determined, the nearest Q+P nodes of the starting node may be analyzed in view of one or more of the loss terms, and the nodes with the lowest or best losses may be selected as the next node, and so on. To avoid constant jumps between non-consequent frames from the dataset, a limit may be put on the number of jumps to non-consequent frames (e.g., no more than one jump per 10 frames). In some embodiments, a new starting node may be selected periodically.

The selector 112 may use the results of the optimization operation(s) (in addition to user selections or inputs corresponding to selected animations 110B from a list and/or ranking of animations 110B as output by the comparator 108) performed by the comparator 108 to select two or more animation sequence or clips 110B that correspond to the audio signal 106.

Figure 1B:
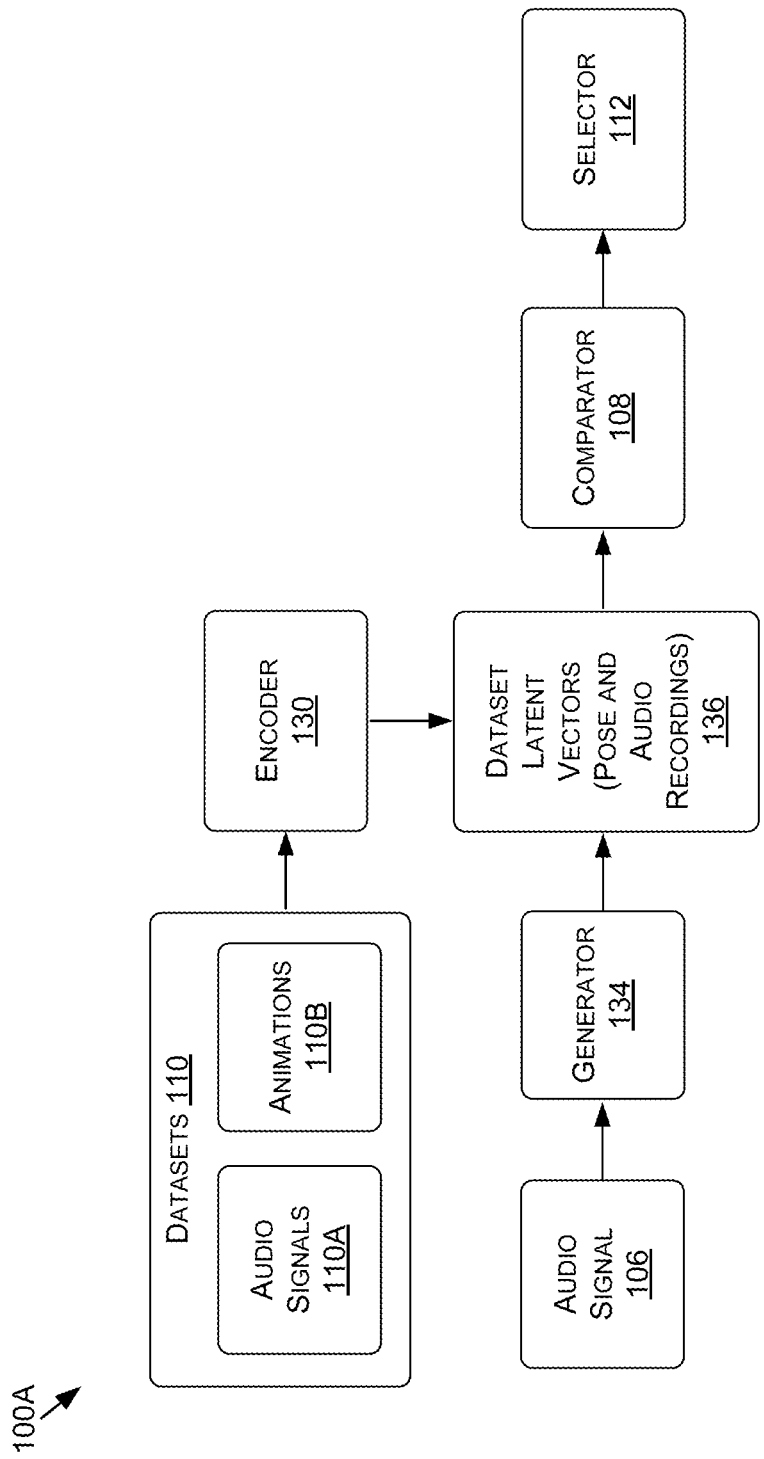
FIG. 1B is an example data flow diagram illustrating a sub-process for selecting data samples from a dataset using latent space vector representations, in accordance with some embodiments of the present disclosure.

In some embodiments, the operations of the comparator 108 and/or selector 112 may be implemented using a machine learning model(s)—e.g., a neural network(s)—that generates latent space representations of the datasets 110 and given audio signal 106 generates latent vectors in the same space. Then, using a similarity measure (e.g., a Euclidean distance), the generated latent vectors 136 from the audio signals 106 are compared to the encoded latent vectors 136 observed within datasets 110. Then, the best matching latent vectors 136 between the generated latent vectors from the audio signal 106 and the encoded latent vectors 136 from the datasets 110 are found, and corresponding poses are stacked to form an output animation sequence. This comparator 108/selector 112 combination may be trained to output animations 110B of minimal loss value—e.g., using the loss functions described herein. For example, and with reference to FIG. 1B, FIG. 1B is an example data flow diagram 100A illustrating a sub-process for selecting data samples from a dataset using latent space vector representations, in accordance with some embodiments of the present disclosure. For example, the sub-process 100A may be executed within the process 100 by the comparator 108 and/or the selector 112.

Encoder 130—e.g., a neural network, such as a convolutional, recurrent, and/or another type of neural network—may transform data samples from the datasets 110 into dataset latent vectors 136 (and/or another latent space representation). For example, the encoder 130) may use the pose at time, r, from the animations 110B and the corresponding audio signal 110A (e.g., [t−h, t+h]) into the encoded latent vectors 136. Generator 134—e.g., a neural network, such as a convolutional, recurrent, and/or another type of neural network—may process the audio signals 106 to generate a sequence of latent vectors 136 in the space where encoder 130 transferred the encoded latent vectors 136 from the data samples of the dataset 110. The comparator 108, in such an embodiment, may determine a similarity measure or score between the generated latent vectors 136 and the encoded latent vectors 136 to find the best matching data samples (e.g., the best match, the top x number of best matches (e.g., ranked, in embodiments), etc.) from the dataset 110). The selector 112 may then select the best data sample(s), and the animation(s) 110B from this data sample(s) (and/or a selected data sample from a list of data samples, as selected by a user) may be used by the stitcher 114 to generate the animation 116.

During training, the encoder 130 may be trained to produce encodings which are optimal to regenerate input from. Thus, an additional network decoder may be defined for encoder 130, and the decoder and encoder 130 may form a network which is trained as an autoencoder or variational autoencoder. The dataset 110 may be used in this portion of the training process. Once encoder 130 is trained, the latent vectors 136 can be precomputed. Then, the generator 134 and/or comparator 108 may be trained. The training procedure for the generator 134 and/or the comparator 108 may use an additional corpus of (training) audio data (not shown). During training, the audio inputs from this additional corpus may be processed by the generator 134 in place of the audio signal 106 (which is used in deployment). The parameters of the networks (e.g., weights and biases) may be updated using an optimization algorithm (e.g., SGD, Adam, RMSprop, LBFGS, etc.) which is supposed to minimize the loss functions described herein computed for generated animation on inputs from datasets of the additional corpus.

The stitcher 114 may then stitch together the two or more animation sequences of clips 110B (where not consequent in the datasets 110) to generate the animation 116. In some embodiments, the clips may be stitched together from a determined transition point of a clip through at least a portion of the frames of the next clip. For example, an entire first animation clip may be used, and stitched to some frame in a next selected animation clip corresponding to the transition point. In other embodiments, the entire second clip may be used, portions of each clip may be used, or a combination thereof.

To stitch together the transition portion between the two clips, interpolation may be used based on the joint information (e.g., angles, velocities, positions, locations, etc.) to transition the joints from the actor in the first clip to the joints in the second clip more gradually and/or seamlessly. For example, an angle, d, corresponding to a difference in position of a joint in a last frame used in the first clip and the position of the joint in the first frame used in the second clip may be computed for each joint. As such, using this d for each joint, some number of frames of the second clip (and/or the first clip, in embodiments) may be adjusted gradually using. e.g., interpolation. In such an example, each joint in the first frame of the second clip may be adjusted by 1.0*d, the second frame may be adjusted by 0.95*d, the third frame by 0.9*d, and so on, for some number of frames (e.g., 10, 32, 60, etc.), until the joint angles used are the actual joint angles corresponding to those frames in the animations 110B. Although a linear interpolation example is provided, this is not intended to be limiting, and non-linear interpolation or other adjustments may be made to transition from the first clip to the second clip. As a result, the animations corresponding to some number of intermediate frames between the first frame of the first clip and the last frame of the second clip may be adjusted by the stitcher 114 to generate the animation 116.

In some embodiments, the stitcher 114 may use a neural network (e.g., a recurrent neural network, generative adversarial network (GAN), and/or another network type) to perform the stitching. For example, the neural network may be trained to use a first set of frames from a first clip and a second set of frames from a second clip, and to generate intermediate frames to transition between the first frames and the second frames. In such an example, the neural network output may be representative of joint angles for one or more joints of the actor that is being animated, and this information may be used to generate the intermediate animation frames between the frames from the first clip and the second clip. The training data for training the neural network may include consequent clips including first frames, intermediate frames, and second frames, and the first frames and second frames may be provided to the neural network as input, and the outputs of the neural network may be compared to the intermediate frames (e.g., to the joint angles corresponding to the intermediate frames). As such, the neural network may learn joint angles that correspond to smooth transitions between first frames and second frames.

The animation 116 that is generated using the stitcher 114 may be used in any number of different implementations. For example, the animation 116 may be displayed on a heads up display (HUD) of a machine (e.g., a vehicle, such as an autonomous or semi-autonomous vehicle), a display of a dashboard or instrument panel of a machine, a display of a center console of a machine, a display of a computing device (e.g., desktop computer, laptop computer, tablet computer, etc.), a display of a smart-home device (e.g., smart speaker/display), a display of a mobile device, a display of a virtual reality (VR), augmented reality (AR), or mixed reality (MR) device, and/or a display of a wearable device. In some non-limiting embodiments, the animation 116 may correspond to an animated actor associated with an intelligent virtual assistant, a character in a gaming application, an assistant in a chat or video conferencing application, a character or avatar in NVIDIA's OMNIVERSE, and/or a translator in a sign language application. The animation 116 may correspond to a human actor, a human-like actor (e.g., a game character, etc.), a non-human actor (e.g., an animal, etc.), and/or another type of actor.

Figure 3:
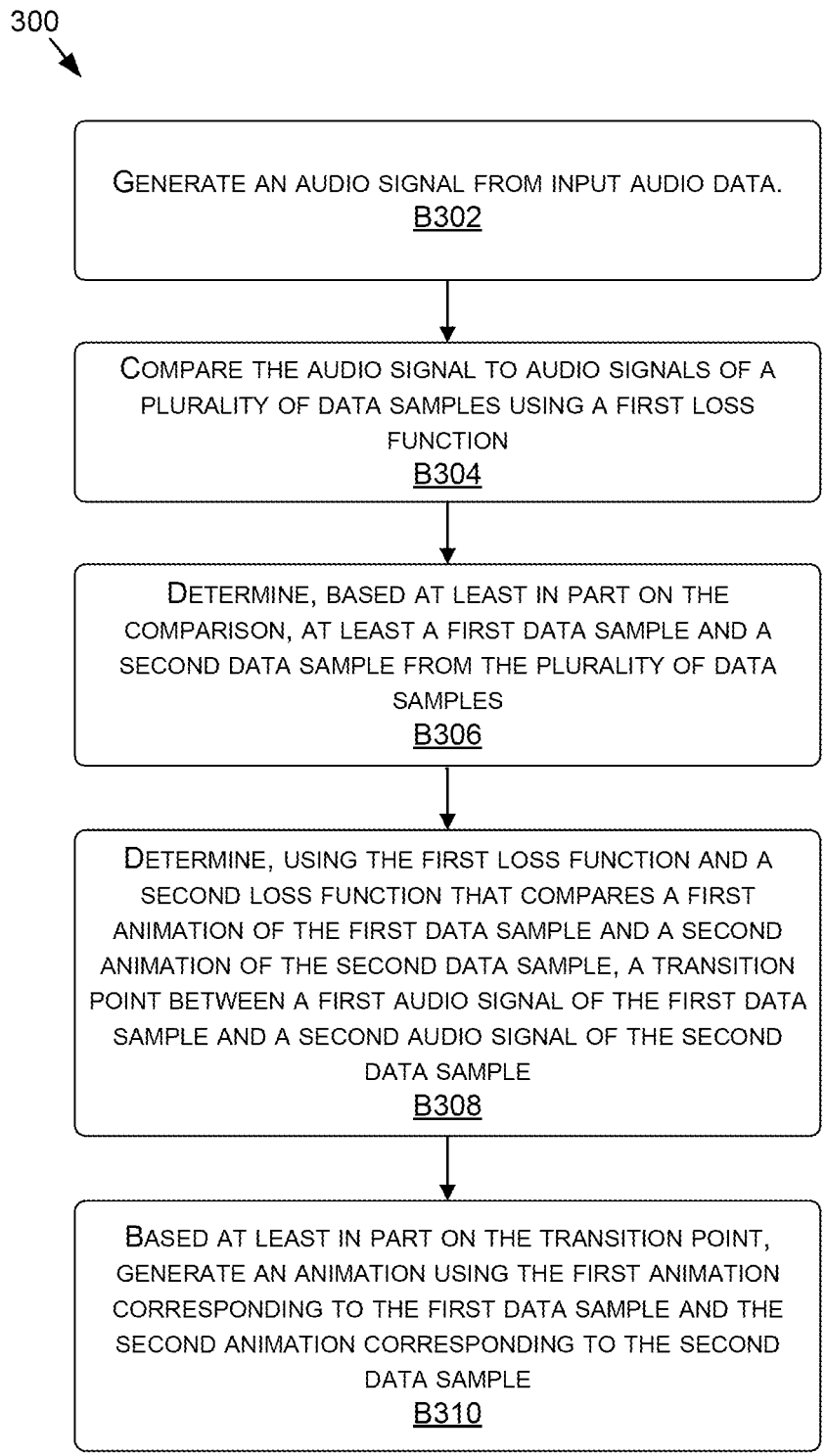
FIG. 3 is a flow diagram showing a method for audio-driven body animation synthesized with voice tempo, in accordance with some embodiments of the present disclosure.

Now referring to FIG. 3, each block of method 300, described herein, comprises a computing process that may be performed using any combination of hardware, firmware, and/or software. For instance, various functions may be carried out by a processor executing instructions stored in memory. The method 300 may also be embodied as computer-usable instructions stored on computer storage media. The method 300 may be provided by a standalone application, a service or hosted service (standalone or in combination with another hosted service), or a plug-in to another product, to name a few. In addition, method 300 is described, by way of example, with respect to the process 100 of FIG. 1A. However, this method 300 may additionally or alternatively be executed by any one process and/or any one system, or any combination of processes and/or systems, including, but not limited to, those described herein.

FIG. 3 is a flow diagram showing a method 300 for audio-driven body animation synthesized with voice tempo, in accordance with some embodiments of the present disclosure. The method 300, at block B302, includes generating an audio signal from input audio data. For example, the machine learning model(s) 104 may generate the audio signal 106 using the input audio data 102.

The method 300, at block B304, includes comparing the audio signal to audio signals of a plurality of data samples using a first loss function. For example, the comparator 108 may compare the audio signal 106 to the audio signals 110A of the datasets 110 using the loss function, $L_a$.

The method 300, at block B306, includes determining, based at least in part on the comparison, at least a first data sample and a second data sample from the plurality of data samples. For example, a first data sample and a second data sample (e.g., a pair of data samples) may be selected from the datasets 110 based on the comparison of the audio signal 106 to the audio signals 110A.

The method 300, at block B308, includes determining, using the first loss function and a second loss function that compares a first animation of the first data sample and a second animation of the second data sample, a transition point between a first audio signal of the first data sample and a second audio signal of the second data sample. For example, the loss function, $L_m$, and the loss function, $L_a$, may be used to determine a transition point between the animations 110B of the first data sample and the second data sample.

The method 300, at block B310, includes, based at least in part on the transition point, generating an animation using the first animation corresponding to the first data sample and the second animation corresponding to the second data sample. For example, using the transition point, the animation 116 may be generated using the first data sample and the second data sample (e.g., using the first animation 110B and the second animation 110B).

EXAMPLE CONTENT STREAMING SYSTEM

Figure 4:
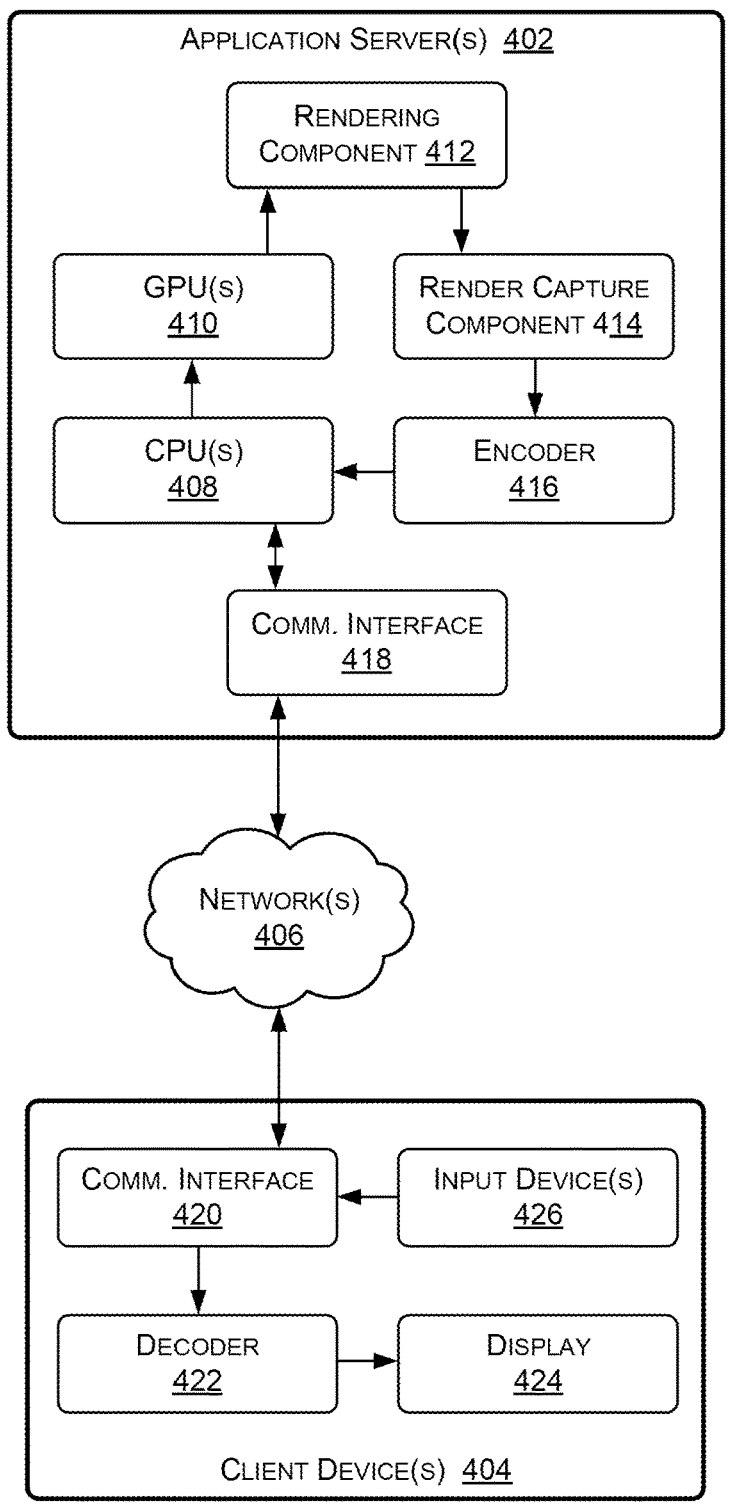
FIG. 4 is a block diagram of an example content streaming system suitable for use in implementing some embodiments of the present disclosure.

Now referring to FIG. 4, FIG. 4 is an example system diagram for a content streaming system 400, in accordance with some embodiments of the present disclosure. FIG. 4 includes application server(s) 402 (which may include similar components, features, and/or functionality to the example computing device 500 of FIG. 5), client device(s) 404 (which may include similar components, features, and/or functionality to the example computing device 500 of FIG. 5), and network(s) 406 (which may be similar to the network(s) described herein). In some embodiments of the present disclosure, the system 400 may be implemented. The application session may correspond to a game streaming application (e.g., NVIDIA GEFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types.

In the system 400, for an application session, the client device(s) 404 may only receive input data in response to inputs to the input device(s), transmit the input data to the application server(s) 402, receive encoded display data from the application server(s) 402, and display the display data on the display 424. As such, the more computationally intense computing and processing is offloaded to the application server(s) 402 (e.g., rendering—in particular ray or path tracing—for graphical output of the application session is executed by the GPU(s) of the game server(s) 402). In other words, the application session is streamed to the client device(s) 404 from the application server(s) 402, thereby reducing the requirements of the client device(s) 404 for graphics processing and rendering.

For example, with respect to an instantiation of an application session, a client device 404 may be displaying a frame of the application session on the display 424 based on receiving the display data from the application server(s) 402. The client device 404 may receive an input to one of the input device(s) and generate input data in response. The client device 404 may transmit the input data to the application server(s) 402 via the communication interface 420 and over the network(s) 406 (e.g., the Internet), and the application server(s) 402 may receive the input data via the communication interface 418. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 412 may render the application session (e.g., representative of the result of the input data) and the render capture component 414 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 402. In some embodiments, one or more virtual machines (VMs)—e.g., including one or more virtual components, such as vGPUs, vCPUs, etc.—may be used by the application server(s) 402 to support the application sessions. The encoder 416 may then encode the display data to generate encoded display data and the encoded display data may be transmitted to the client device 404 over the network(s) 406 via the communication interface 418. The client device 404 may receive the encoded display data via the communication interface 420 and the decoder 422 may decode the encoded display data to generate the display data. The client device 404 may then display the display data via the display 424.

EXAMPLE COMPUTING DEVICE

Figure 5:
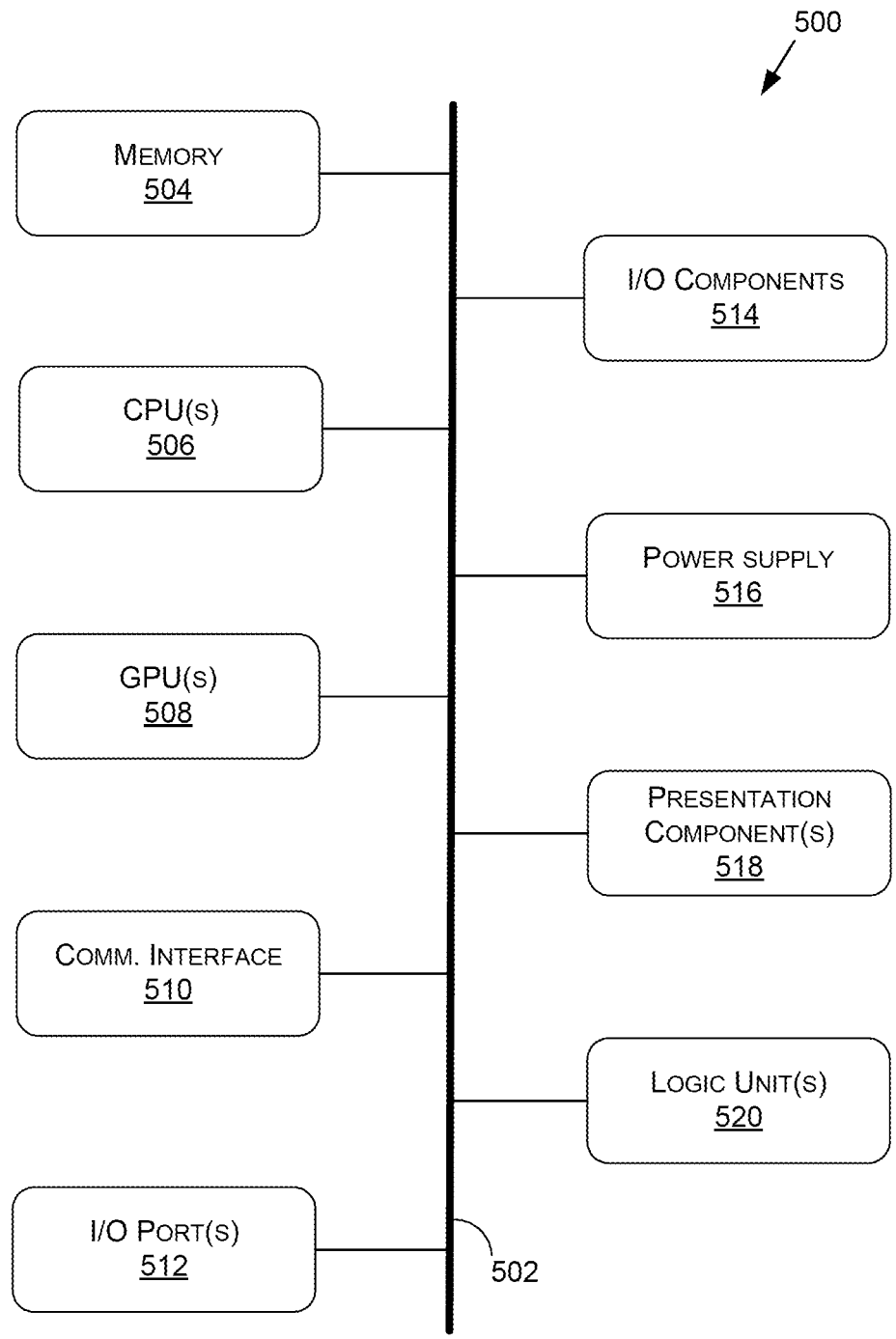
FIG. 5 is a block diagram of an example computing device suitable for use in implementing some embodiments of the present disclosure.

FIG. 5 is a block diagram of an example computing device(s) 500 suitable for use in implementing some embodiments of the present disclosure. Computing device 500 may include an interconnect system 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, one or more presentation components 518 (e.g., display(s)), and one or more logic units 520. In at least one embodiment, the computing device(s) 500 may comprise one or more virtual machines (VMs), and/or any of the components thereof may comprise virtual components (e.g., virtual hardware components). For non-limiting examples, one or more of the GPUs 508 may comprise one or more vGPUs, one or more of the CPUs 506 may comprise one or more vCPUs, and/or one or more of the logic units 520 may comprise one or more virtual logic units. As such, a computing device(s) 500 may include discrete components (e.g., a full GPU dedicated to the computing device 500), virtual components (e.g., a portion of a GPU dedicated to the computing device 500), or a combination thereof.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media. The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Data Processing Units (DPUs), Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 510 may include one or more receivers, transmitters, and/or transceivers that enable the computing device 500 to communicate with 20) other computing devices via an electronic communication network, included wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 520 and/or communication interface 510 may include one or more data processing units (DPUs) to transmit data received over a network and/or through interconnect system 502 directly to (e.g., a memory of) one or more GPU(s) 508.

The I/O ports 512 may enable the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may be include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, DPUs, etc.), and output the data (e.g., as an image, video, sound, etc.).

EXAMPLE DATA CENTER

Figure 6:
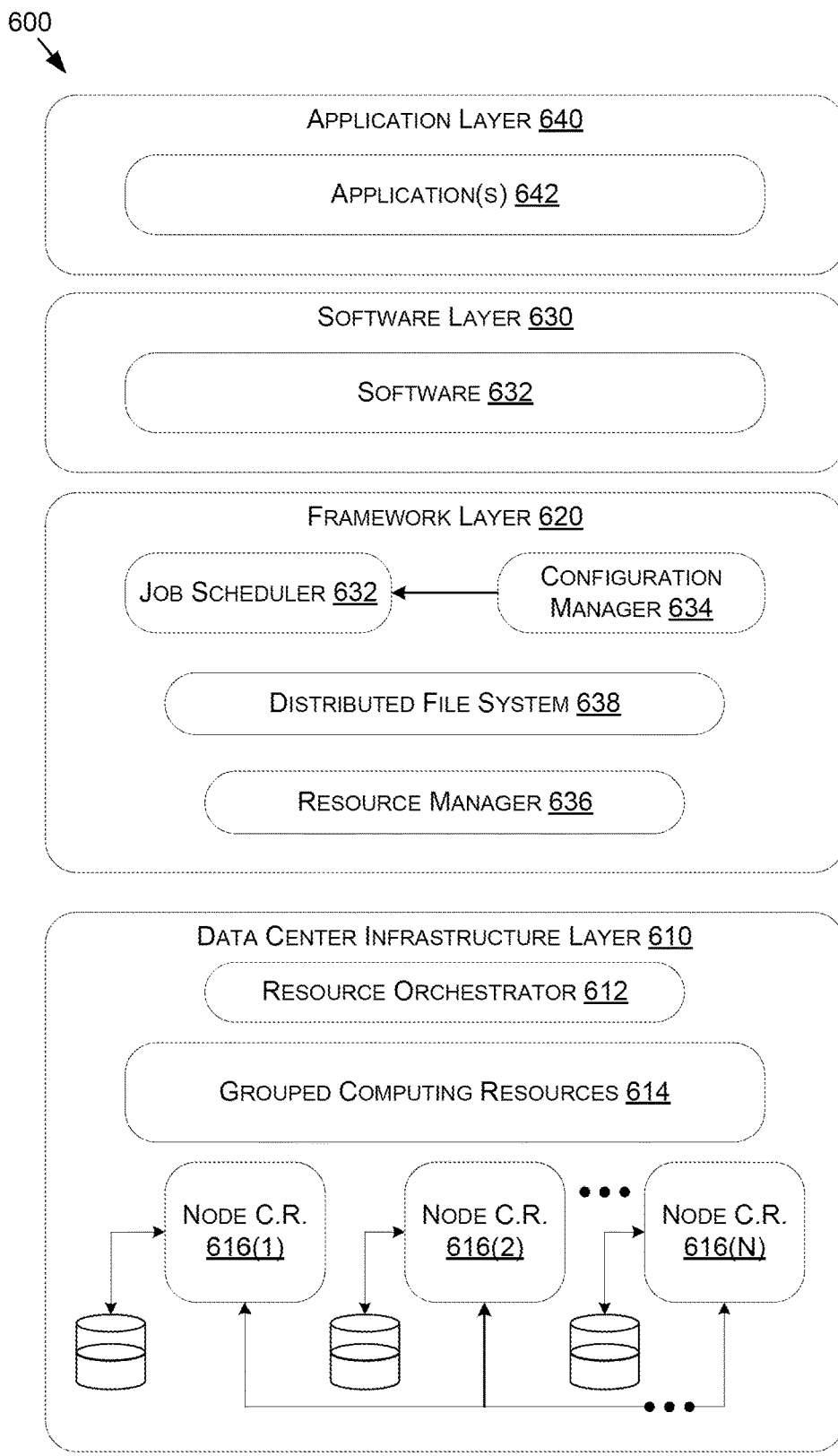
FIG. 6 is a block diagram of an example data center suitable for use in implementing some embodiments of the present disclosure.

FIG. 6 illustrates an example data center 600 that may be used in at least one embodiments of the present disclosure. The data center 600 may include a data center infrastructure layer 610, a framework layer 620, a software layer 630, and/or an application layer 640.

As shown in FIG. 6, the data center infrastructure layer 610 may include a resource orchestrator 612, grouped computing resources 614, and node computing resources ("node C.R.s") 616(1)-616(N), where "N" represents any whole, positive integer. In at least one embodiment, node C.R.s 616(1)-616(N) may include, but are not limited to, any number of central processing units (CPUs) or other processors (including DPUs, accelerators, field programmable gate arrays (FPGAs), graphics processors or graphics processing units (GPUS), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 616(1)-616(N) may correspond to a server having one or more of the above-mentioned computing resources. In addition, in some embodiments, the node C.R.s 616(1)-6161(N) may include one or more virtual components, such as vGPUs, vCPUs, and/or the like, and/or one or more of the node C.R.s 616(1)-616(N) may correspond to a virtual machine (VM).

In at least one embodiment, grouped computing resources 614 may include separate groupings of node C.R.s 616 housed within one or more racks (not shown), or many racks housed in data centers at various geographical locations (also not shown). Separate groupings of node C.R.s 616 within grouped computing resources 614 may include grouped compute, network, memory or storage resources that may be configured or allocated to support one or more workloads. In at least one embodiment, several node C.R.s 616 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 612 may configure or otherwise control one or more node C.R.s 616(1)-616(N) and/or grouped computing resources 614. In at least one embodiment, resource orchestrator 612 may include a software design infrastructure (SDI) management entity for the data center 600. The resource orchestrator 612 may include hardware, software, or some combination thereof.

In at least one embodiment, as shown in FIG. 6, framework layer 620 may include a job scheduler 632, a configuration manager 634, a resource manager 636, and/or a distributed file system 638. The framework layer 620 may include a framework to support software 632 of software layer 630 and/or one or more application(s) 642 of application layer 640. The software 632 or application(s) 642 may respectively include web-based service software or applications, such as those provided by Amazon Web Services, Google Cloud and Microsoft Azure. The framework layer 620 may be, but is not limited to, a type of free and open-source software web application framework such as Apache Spark™ (hereinafter "Spark") that may utilize distributed file system 638 for large-scale data processing (e.g., "big data"). In at least one embodiment, job scheduler 632 may include a Spark driver to facilitate scheduling of workloads supported by various layers of data center 600. The configuration manager 634 may be capable of configuring different layers such as software layer 630 and framework layer 620 including Spark and distributed file system 638 for supporting large-scale data processing. The resource manager 636 may be capable of managing clustered or grouped computing resources mapped to or allocated for support of distributed file system 638 and job scheduler 632. In at least one embodiment, clustered or grouped computing resources may include grouped computing resource 614 at data center infrastructure layer 610. The resource manager 636 may coordinate with resource orchestrator 612 to manage these mapped or allocated computing resources.

In at least one embodiment, software 632 included in software layer 630 may include software used by at least portions of node C.R.s 616(1)-616(N), grouped computing resources 614, and/or distributed file system 638 of framework layer 620. One or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616(N), grouped computing resources 614, and/or distributed file system 638 of framework layer 620. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 634, resource manager 636, and resource orchestrator 612 may implement any number and type of self-modifying actions based on any amount and type of data acquired in any technically feasible fashion. Self-modifying actions may relieve a data center operator of data center 600 from making possibly bad configuration decisions and possibly avoiding underutilized and/or poor performing portions of a data center.

The data center 600 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 600. In at least one embodiment, trained or deployed machine learning models corresponding to one or more neural networks may be used to infer or predict information using resources described above with respect to the data center 600 by using weight parameters calculated through one or more training techniques, such as but not limited to those described herein.

In at least one embodiment, the data center 600 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

EXAMPLE NETWORK ENVIRONMENTS

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 500 of FIG. 5—e.g., each device may include similar components, features, and/or functionality of the computing device(s) 500. In addition, where backend devices (e.g., servers, NAS, etc.) are implemented, the backend devices may be included as part of a data center 600, an example of which is described in more detail herein with respect to FIG. 6.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 500 described herein with respect to FIG. 5. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:
one or more circuits to:
generate an audio signal from input audio data;
compute, using a first loss function, one or more differences between the audio signal and audio signals of a plurality of data samples;
determine, based at least on the one or more differences, at least a first data sample and a second data sample from the plurality of data samples, the first data sample including a first audio signal corresponding to a first animation and the second data sample including a second audio signal corresponding to a second animation;
determine, using the first loss function and a second loss function that compares the first animation and the second animation, a transition point between the first audio signal and the second audio signal; and
based at least on the transition point, generate an animation based at least on combining at least a portion of the first animation and at least a portion of the second animation.

2. The processor of claim 1, wherein the animation is generated using the one or more circuits by stitching at least the portion of the first animation with at least an initial portion of the second animation using interpolation between one or more angles corresponding to one or more joints of an animated actor in the first animation and one or more joints of the animated actor in at least the initial portion of the second animation.

3. The processor of claim 1, wherein the animation is generated using the one or more circuits by stitching at least the portion of the first animation with at least the portion of the second animation using a deep neural network trained to generate intermediate animation frames between animations.

4. The processor of claim 1, wherein the audio signal includes a one-dimensional audio signal representative of a tempo of the input audio data.

5. The processor of claim 1, wherein the second loss function is based on one or more second differences between at least one of:
one or more first locations of one or more joints of an actor in the first animation and one or more second locations of the one or more joints of the actor in the second animation, or
one or more first velocities of the one or more joints of the actor in the first animation and one or more second velocities of the one or more joints of the actor in the second animation.

6. The processor of claim 5, wherein at least one of the one or more differences or the one or more second differences are computed using a mean squared difference.

7. The processor of claim 1, wherein the audio signal is generated using a neural network that includes one or more first layers to compute a latent space feature representation of the input audio data and one or more second layers to compute the audio signal using the latent space feature representation.

8. The processor of claim 1, further comprising processing circuitry to cause display of the animation on at least one of:
a heads up display of a machine,
a display of a dashboard or instrument panel of a machine,
a display of a center console of a machine,
a display of a computing device,
a display of a smart-home device,
a display of a mobile device,
a display of a virtual reality (VR), augmented reality (AR), or mixed reality (MR) device, or
a display of a wearable device.

9. The processor of claim 1, wherein the animation corresponds to an animated actor associated with at least one of:
an intelligent virtual assistant,
a character in a gaming application,
an assistant in a chat or video conferencing application, or
a translator in a sign language application.

10. The processor of claim 1, wherein the processor is comprised in at least one of:
a control system for an autonomous or semi-autonomous machine;
a system for performing simulation operations;
a system for performing deep learning operations;
a system implemented using an edge device;
a system implemented using a robot;
a system incorporating one or more virtual machines (VMs);
a system implemented at least partially in a data center; or
a system implemented at least partially using cloud computing resources.

11. The processor of claim 1, the one or more circuits further to:
compute, using the second loss function, one or more scores indicative of one or more magnitudes of one or more differences between one or more first poses of an actor in the first animation and one or more second poses of the actor in the second animation,
wherein the determination of the transition point is further based at least on the one or more scores.

12. A system comprising:
one or more microphones;
one or more memory units; and
one or more processing units comprising processing circuitry to:
generate, using a neural network, an audio signal representative of a tempo associated with input audio data obtained using the one or more microphones;
determine, based at least on a first computed difference between the audio signal and each of a plurality of audio signals associated with a dataset, at least a first data sample and a second data sample;
determine, based at least on a second computed difference between one or more joints of an actor in a first animation associated with the first data sample and the one or more joints of the actor in a second animation associated with the second data sample, a transition point between the first animation and the second animation; and generate an animation based at least on combining at least a portion of the first animation with at least a portion of the second animation based at least on the transition point.

13. The system of claim 12, wherein the tempo corresponds to a number of phonetic units pronounced in a given time unit.

14. The system of claim 12, wherein the first computed difference is computed using a first loss function and the second computed difference is computed using a second loss function.

15. The system of claim 12, wherein the neural network includes one or more first layers to compute a latent space feature representation of the input audio data and one or more second layers to compute the audio signal using the latent space feature representation.

16. The system of claim 12, wherein the second computed difference corresponds to differences between at least one of:

locations of the one or more joints of an actor in the first animation and locations of the one or more joints of the actor in the second animation, or velocities of the one or more joints of the actor in the first animation and velocities of the one or more joints of the actor in the second animation.

17. The system of claim 12, wherein the system is comprised in at least one of:

a control system for an autonomous or semi-autonomous machine;
a system for performing simulation operations;
a system for performing deep learning operations;
a system implemented using an edge device;
a system implemented using a robot;
a system incorporating one or more virtual machines (VMs);
a system implemented at least partially in a data center; or
a system implemented at least partially using cloud computing resources.

18. The system of claim 12, wherein:
the first data sample includes a first audio signal,
the second data sample includes a second audio signal,
the first computed difference between the audio signal and each of the first audio signal and the second audio signal is less than a threshold, and
the determination of the at least the first data sample and the second data sample is based at least on the first computed difference being less than the threshold.

19. A processor comprising:

processing circuitry to generate an animation based at least on combining at least a first portion of a first animation from a dataset and at least a second portion of a second animation from the dataset based at least on at least one of:

determining that one or more first differences between an input audio signal and audio signals associated with each of the first animation and the second animation are less than a first threshold; or determining, using a second loss function, that one or more second differences between first joint locations of an actor in the first animation and second joint locations of the actor in the second animation are less than a second threshold.

20. The processor of claim 19, wherein the determining that the one or more first differences are less than the first threshold is executed using a first loss function to compute one or more first scores indicative of one or more magnitudes of the one or more first differences.

21. The processor of claim 20, wherein the determining that the one or more second differences are less than the second threshold is executed using a second loss function to compute one or more second scores indicative of one or more magnitudes of the one or more second differences.

22. The processor of claim 1, the one or more circuits further to compute, using the first loss function, one or more differences between the audio signal and each of the first audio signal and the second audio signal; and determine that the one or more differences between the audio signal and each of the first audio signal and the second audio signal are less than a threshold, wherein the determination of the first data sample and the second data sample from the plurality of data samples is based at least on the one or more differences being less than the threshold.

* * * * *